(12) United States Patent
Natanzon

(10) Patent No.: US 12,117,906 B2
(45) Date of Patent: Oct. 15, 2024

(54) DEVICE AND METHOD FOR MERGING BACKUP POLICIES

(71) Applicant: Huawei Technologies Co., Ltd., Shenzhen (CN)

(72) Inventor: Assaf Natanzon, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/156,851

(22) Filed: Jan. 19, 2023

(65) Prior Publication Data

US 2023/0153207 A1 May 18, 2023

Related U.S. Application Data

(63) Continuation of application No. PCT/EP2020/070794, filed on Jul. 23, 2020.

(51) Int. Cl.
*G06F 11/14* (2006.01)

(52) U.S. Cl.
CPC ...... *G06F 11/1461* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 9,454,324 B1 | 9/2016 | Madhavapeddi | |
| 2015/0143064 A1 | 5/2015 | Bhargava et al. | |
| 2018/0278689 A1* | 9/2018 | Kottomtharayil | ... H04L 67/1097 |
| 2021/0286684 A1* | 9/2021 | Nara | ... G06F 11/3013 |

OTHER PUBLICATIONS

Rubrik, "Rubrik SLA Domain: Settings, Ops, Considerations," Aug. 9, 2019, BLOG, 6 pages.

* cited by examiner

*Primary Examiner* — Eddy Cheung
(74) *Attorney, Agent, or Firm* — Conley Rose, P.C.

(57) ABSTRACT

A device for merging backup policies is configured to determine, if a first backup policy comprising a first set of rules, and a second backup policy comprising a second set of rules, are assigned to a backup object. The device is further configured to, when the first backup policy and the second backup policy are assigned to the backup object, generate a merged backup policy comprising a merged set of rules, based on the first backup policy and the second backup policy. A resource consumption of a backup created according to the merged backup policy is below a predefined threshold.

20 Claims, 4 Drawing Sheets

DEVICE AND METHOD FOR MERGING BACKUP POLICIES

CROSS-REFERENCE TO RELATED APPLICATIONS

This application is a continuation of International Patent Application No. PCT/EP2020/070794, filed on Jul. 23, 2020. The disclosure of the aforementioned application is hereby incorporated by reference in its entirety.

TECHNICAL FIELD

The present disclosure relates to the field of storage systems, in particular backup systems. More specifically, a device and a method are provided, which allow for automatically merging backup policies, which are assigned to a same backup object, e.g. in case that the backup policies are conflicting.

BACKGROUND

In the field of backup systems, a backup of a protection object (which can also be called backup object) is typically created based on a backup policy.

The backup is a copy of the protection object, more specifically a copy of the protected data at a particular point in time.

A protection object is an entity that comprises data which requires protection, for example a virtual machine, a database, a file-system, or a file. A protection object may be part of a hierarchy of objects. For example, a virtual machine may be included in a folder, or in a cluster; and a file may be stored in a file system, or a folder.

A backup policy defines parameters according to which a backup is created. For example, the backup policy may include at least one of: a backup frequency rule, a backup data format rule, a backup activity rule, a backup archive rule (also called retention period), or a backup replication rule. The backup frequency rule defines at what intervals the backup is created. The backup data format rule defines according to which data format the backup is stored. The backup activity rule defines a time window during which the backup can be created. The backup archive rule defines whether the backup is stored in a local storage or in an archive. The backup replication rule defines how replicas of the backup are organized.

An association of the backup policy to the protection object defines that the rules of the backup policy are applied to the protection object.

In order to automate protection management, a backup system allows for automatic assignment of policies.

Taking a virtual machine scenario as an example, a backup policy can be automatically assigned to a whole directory in a virtual environment. That is, all virtual machines in the directory are assigned with the same backup policy.

Alternatively, backup policies can also be automatically assigned to the virtual machines based on characteristics of the virtual machines, as shown in the following example rules:

Assign policy A to all virtual machines running operating system 1.
Assign policy B to all virtual machines running operating system 2.
Assign policy C to all virtual machines, the name of which starting with "special".
Assign policy D to all virtual machines having a database system installed.

This causes a problem, when there is a virtual machine, which fulfills several rules. For example, when there is a virtual machine running operating system 1, having a database system installed and the name of which is "special-VM-OS1-DB", then this virtual machine will have policies A, C and D assigned.

Presently, there are two approaches to resolve such conflicts. When there is a conflict of assigned backup policies, a user can choose the relevant backup policy by manual intervention. Alternatively, it can be allowed to assign multiple policies at the same time and create separate backups based on each policy.

The problem with these approaches is that either the user needs to be part of the decision, which avoids complete automation and causes a delay until the user resolves the problems; or when the protection object is backed up multiple times (because there are multiple backup policies assigned), the amount of storage space and central processing unit (CPU) time required are too large and the solution may become too resource-expensive and cost-expensive.

SUMMARY

In view of the above-mentioned problem, an objective of embodiments of the present disclosure is to improve the automatic generation of a backup policy.

This or other objectives may be achieved by embodiments of the present disclosure as described in the enclosed independent claims. Advantageous implementations of embodiments of the present disclosure are further defined in the dependent claims.

A first aspect of the present disclosure provides a device for merging backup policies, wherein the device is configured to determine, if a first backup policy comprising a first set of rules, and a second backup policy comprising a second set of rules, are assigned to a backup object; when the first backup policy and the second backup policy are assigned to the backup object, generate a merged backup policy comprising a merged set of rules, based on the first backup policy and the second backup policy; wherein a resource consumption of a backup created according to the merged backup policy is below a predefined threshold.

This ensures that a single, unified backup policy can be provided, which allows for efficient backup creation.

In particular, the backup object can also be called protection object or backup data.

In particular, a backup policy defines parameters and/or rules according to which a backup is created. In particular, a backup policy includes at least one of a backup frequency parameter, a backup activity parameter, a retention period, a backup replication rule, or a backup data format rule.

In an implementation form of the first aspect, the resource consumption of the backup created according to the merged backup policy is smaller than the sum of a resource consumption of a backup created according to the first backup policy and a resource consumption of a backup created according to the second backup policy.

This ensures that a single, unified backup policy can be provided, which allows more efficient backup creation compared to creating a backup according to two separate backup policies.

In particular, resource consumption includes at least one of: CPU power used for creating a backup, memory used for creating a backup, storage (of e.g. a local storage or an archive storage) capacity used for storing a backup, network traffic used for creating a backup, network bandwidth used for creating a backup, or a number of backup processes performed.

In a further implementation form of the first aspect, the merged set of rules is a union set of the first set of rules and the second set of rules.

This ensures that no rules are lost when merging the first and second set of rules and that there are no double rules in the merged set of rules.

In particular, when in the second backup policy there is no element corresponding to an element in the first backup policy (e.g., when the first backup policy comprises a backup frequency rule, but the second backup policy does not), this is regarded as the second set of rules being an empty set (also called "null set").

In a further implementation form of the first aspect, the merged backup policy further defines to create the backup based on a pre-defined rule in the merged set of rules.

This allows for flexibly selecting a rule in the merged set of rules according to which the backup is to be generated.

In particular, the merged policy further defines to create the backup based on exclusively one rule in the merged set of rules.

In a further implementation form of the first aspect, the merged backup policy further defines to create the backup based on each rule in the merged set of rules.

This ensures that a backup, which is created according to the merged set of rules, complies with all requirements of the rules in the first set of rules and in the second set of rules.

In a further implementation form of the first aspect, the merged backup policy further defines to create the backup based on a largest element and/or based on a smallest element in the merged set of rules.

This ensures that, when there are several parameters of a same backup attribute in the merged backup policy, the backup can be created according to the largest or smallest element of them, thereby also meeting the requirements of the remaining parameters.

In a further implementation form of the first aspect, the first set of rules comprises a first backup frequency rule, the second set of rules comprises a second backup frequency rule, and the merged set of rules comprises the first backup frequency rule and the second backup frequency rule; and wherein the merged backup policy further defines that the backup is created according to each backup frequency rule in the merged set of rules.

This ensures that, when there are two different backup frequencies in the first and second set of rules, a backup is created at all points of time as it would be the case for the first set of rules, and also at all points of time, as it would be the case for the second set of rules. That is, the backup frequency according to the merged backup policy fulfills the requirements of the first as well as of the second backup policy.

In particular, a backup frequency rule is a rule defining a time interval between two subsequent backups.

In a further implementation form of the first aspect, the first set of rules comprises a first backup activity rule, the second set of rules comprises a second backup activity rule, and the merged set of rules comprises the first backup activity rule and the second backup activity rule; and wherein the merged backup policy further defines that the backup is created according to at least one backup activity rule in the merged set of rules.

This ensures that the backup is going to be created during at least one predefined backup activity period (that is, during at least one predefined time window).

In particular, a backup activity rule is a rule defining a time window during which a backup can be created.

In a further implementation form of the first aspect, the first set of rules comprises a first retention period, the second set of rules comprises a second retention period, and the merged set of rules comprises the first retention period and the second retention period; and wherein the merged backup policy further defines that the backup is kept in a predefined storage for the longer one of the first retention period and the second retention period.

This ensures that the backup is kept for the longest necessary period.

In particular, the predefined storage can be a local storage or an archive storage. In particular, a local storage is a storage that is comprised by the device or directly attached to the device. In particular, an archive storage is a separate storage outside the device. In particular, the archive storage is a cheaper storage tier, which is used to retain copies for a very long time, or to retain copies that are very rarely accessed.

In a further implementation form of the first aspect, the first set of rules comprises a first backup replication rule, the second set of rules comprises a second backup replication rule, and the merged set of rules comprises the first backup replication rule and the second backup replication rule; and wherein the merged backup policy further defines that the backup is replicated according to each backup replication rule in the merged set of rules.

This ensures that sufficient replicas of the backup are kept at a predefined place.

In particular, a backup replication rule is a rule defining how long a replica is kept at a predefined storage, and/or which instance of a replica is kept at a predefined storage.

In a further implementation form of the first aspect, the first set of rules comprises a first backup data format rule, the second set of rules comprises a second backup data format rule; and wherein the merged backup policy further defines a period of time for which the backup is kept in a predefined data format based on the first backup data format rule, the second backup data format rule, an amount of storage that is occupied by the backup when it is created according to the first backup data format rule and an amount of storage that is occupied by the backup when it is created according to the second backup data format rule.

This ensures that a backup format according to which the backup is stored, is optimized.

In particular, a backup data format rule is a rule defining how long a backup is kept in a predefined data format (e.g., a native format or a de-duplicated format).

In a further implementation form of the first aspect, the device is further configured to, when the first backup policy and the second backup policy are assigned to the backup object, remove the assignment of the first backup policy and the second backup policy from the backup object and assign the merged backup policy to the backup object.

This ensures that the backup is only created according to the merged backup policy, thereby saving resourced by not additionally creating a backup also based on the first and second backup policy.

In a further implementation form of the first aspect, the device is further configured to create the backup of the backup object based on the merged backup policy.

This ensures that the device also can perform the technical steps to actually create the backup, based on the merged backup policy.

A second aspect of the present disclosure provides a method for merging backup policies, wherein the method comprises the steps of determining, by a device, if a first backup policy comprising a first set of rules, and a second backup policy comprising a second set of rules, are assigned to a backup object; when the first backup policy and the second backup policy are assigned to the backup object, generating, by the device, a merged backup policy comprising a merged set of rules, based on the first backup policy and the second backup policy; wherein a resource consumption of a backup created according to the merged backup policy is below a predefined threshold.

In an implementation form of the second aspect, the resource consumption of the backup created according to the merged backup policy is smaller than the sum of a resource consumption of a backup created according to the first backup policy and a resource consumption of a backup created according to the second backup policy.

In a further implementation form of the second aspect, the merged set of rules is a union set of the first set of rules and the second set of rules.

In a further implementation form of the second aspect, the merged backup policy further defines to create the backup based on a pre-defined rule in the merged set of rules.

In a further implementation form of the second aspect, the merged backup policy further defines to create the backup based on each rule in the merged set of rules.

In a further implementation form of the second aspect, the merged backup policy further defines to create the backup based on a largest element and/or based on a smallest element in the merged set of rules.

In a further implementation form of the second aspect, the first set of rules comprises a first backup frequency rule, the second set of rules comprises a second backup frequency rule, and the merged set of rules comprises the first backup frequency rule and the second backup frequency rule; and wherein the merged backup policy further defines that the backup is created according to each backup frequency rule in the merged set of rules.

In a further implementation form of the second aspect, the first set of rules comprises a first backup activity rule, the second set of rules comprises a second backup activity rule, and the merged set of rules comprises the first backup activity rule and the second backup activity rule; and wherein the merged backup policy further defines that the backup is created according to at least one backup activity rule in the merged set of rules.

In a further implementation form of the second aspect, the first set of rules comprises a first retention period, the second set of rules comprises a second retention period, and the merged set of rules comprises the first retention period and the second retention period; and wherein the merged backup policy further defines that the backup is kept in a predefined storage for the longer one of the first retention period and the second retention period.

In a further implementation form of the second aspect, the first set of rules comprises a first backup replication rule, the second set of rules comprises a second backup replication rule, and the merged set of rules comprises the first backup replication rule and the second backup replication rule; and wherein the merged backup policy further defines that the backup is replicated according to each backup replication rule in the merged set of rules.

In a further implementation form of the second aspect, the first set of rules comprises a first backup data format rule, the second set of rules comprises a second backup data format rule; and wherein the merged backup policy further defines a period of time for which the backup is kept in a predefined data format based on the first backup data format rule, the second backup data format rule, an amount of storage that is occupied by the backup when it is created according to the first backup data format rule and an amount of storage that is occupied by the backup when it is created according to the second backup data format rule.

In a further implementation form of the second aspect, the method further includes, when the first backup policy and the second backup policy are assigned to the backup object, removing, by the device, the assignment of the first backup policy and the second backup policy from the backup object and assign the merged backup policy to the backup object.

In a further implementation form of the second aspect, the method further includes creating, by the device, the backup of the backup object based on the merged backup policy.

The second aspect and its implementation forms include the same advantages as the first aspect and its respective implementation forms.

A third aspect of the present disclosure provides a computer program product comprising instructions which, when the program is executed by a computer, cause the computer to carry out the steps of the method of the second aspects or any of its implementation forms.

The third aspect and its implementation forms include the same advantages as the second aspect and its respective implementation forms.

A fourth aspect of the present disclosure provides a non-transitory computer-readable storage medium comprising instructions which, when executed by a computer, cause the computer to carry out the steps of the method of the second aspect or any of its implementation forms.

The fourth aspect and its implementation forms include the same advantages as the second aspect and its respective implementation forms.

In other words, the present disclosure provides a solution to merge multiple backup policies into a new coherent policy (i.e., the merged backup policy), and thus when there is a conflict and more than one policy is assigned to a backup object, the solution will automatically create a unified backup policy which complies with all the rules of the policies, creates a minimal amount of data and does not require multiple backup tasks running and consuming more storage and more CPU. When there are multiple backup policies assigned to a workload, the solution will instead create a single new policy (i.e., the merged backup policy) automatically and assign the new policy to the workload. The merged backup policy will merge all the rules of the available policies, by merging each of the rules, as it is also going to be described below.

It has to be noted that all devices, elements, units and means described in the present disclosure could be implemented in the software or hardware elements or any kind of combination thereof. All steps which are performed by the various entities described in the present disclosure as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above-described aspects and implementation forms of the present disclosure will be explained in the following description of specific embodiments in relation to the enclosed drawings, in which.

DESCRIPTION OF EMBODIMENTS

Figure 1:
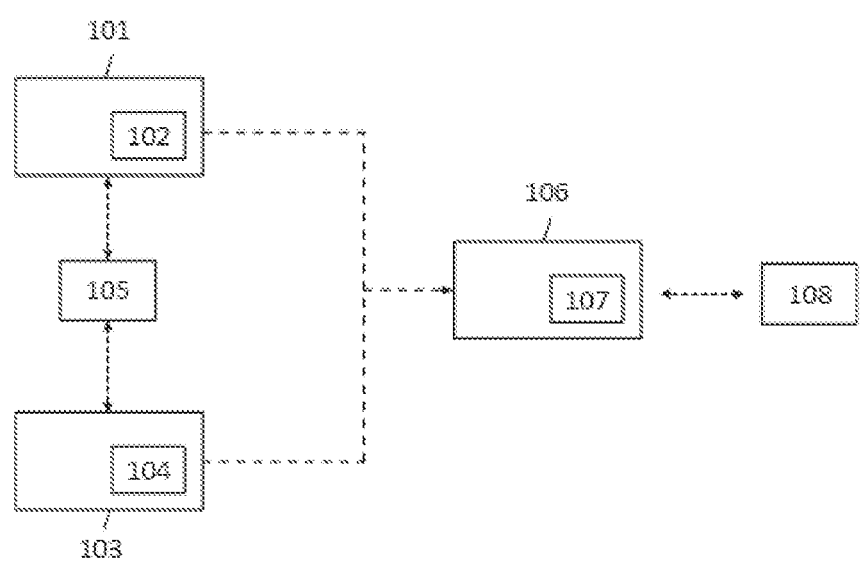
FIG. 1 is a diagram illustrating a schematic view of a device according to an embodiment of the present disclosure.

FIG. 1 is a diagram illustrating a schematic view of a device 100 according to an embodiment of the present disclosure. The device 100 is for merging a first backup policy 101 and a second backup policy 103. To this end, the device 100 is configured to determine, if the first backup policy 101 comprising a first set of rules 102, and the second backup policy 103 comprising a second set of rules 104, are assigned to a backup object 105.

When the first backup policy 101 and the second backup policy 103 are assigned to the backup object 105, the device 100 is further configured to generate a merged backup policy 106 comprising a merged set of rules 107 based on the first backup policy 101 and the second backup policy 103.

In other words, the merged backup policy 106 is a consolidated backup policy based on the content of the first backup policy 101 and the second backup policy 103. In particular, the merged set of rules 107 is a consolidated set of rules based on the first set of rules 102 and the second set of rules 104.

A resource consumption of a backup 108 created according to the merged backup policy 106 is below a predefined threshold. That is, creating the backup 108 according to the merged backup policy 106 helps to save resources compared to creating the backup 108 based on the first backup policy 101 and the second backup policy 103. Moreover, a backup process, which only involves the merged backup policy 106, can be automated more effectively, as no user interaction, e.g., for removing conflicts in backup policies, is required.

In particular, the backup 108 that is created according to the merged backup policy 106 (which involved processing the rules in the merged set of rules 107) complies with a same service level agreement (SLA), which would also be fulfilled when a first backup was created according to the first backup policy 101 and separately, a second backup was created according to the second backup policy 103. In other words, when the SLA is fulfilled, the backup 108 complies with the SLA.

An SLA is used to refer to an agreed specification of a service content, a delivery metric, and a range of acceptable quantities (e.g., performance, capacity, availability, connectivity, redundancy, etc.) of these metrics. In the scope of storage systems or backup systems, the term SLA is a short name for "data protection SLA" of a backup object.

Figure 2:
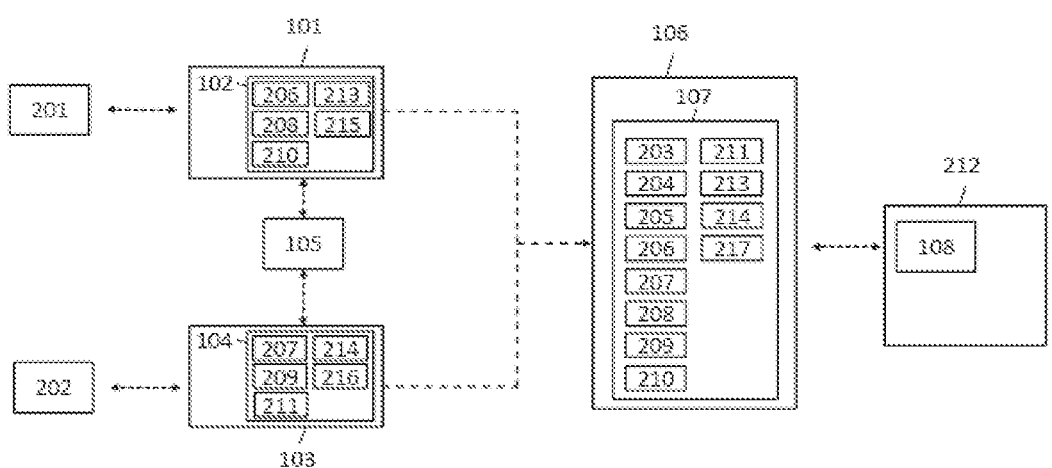
FIG. 2 is a diagram illustrating a schematic view of a device according to an embodiment of the present disclosure in more detail.

FIG. 2 is a diagram illustrating a schematic view of the device 100 according to another embodiment of the present disclosure in more detail. The device 100 shown in FIG. 2 comprises all features and functionality of the device 100 of FIG. 1, as well as the following optional features:

As it is illustrated in FIG. 2, a first backup 201 generally may be created according to the first backup policy 101, resulting in a corresponding resource consumption. Further, a second backup 202 generally may be created according to the second backup policy 103, again resulting in a corresponding resource consumption. However, the resource consumption of the backup 108 created according to the merged backup policy 106 is smaller than the sum of a resource consumption of a backup 201 created according to the first backup policy 101 and a resource consumption of a backup 202 created according to the second backup policy 103.

In a specific embodiment, this is because less operating steps need to be performed when creating the backup 108 based on the merged set of rules 107, in contrast to creating the first backup 201 based on the first set of rules 102, and creating the second backup 202 based on the second set of rules 104.

Optionally, the merged set of rules 107 can be a union set of the first set of rules 102 and the second set of rules 104. That is, when merging the first set of rules 102 and the second set of rules 104, identical double elements in the merged set of rules 107 are avoided. That is, in such a case, creating the backup 108 based on the merged set of rules 107 leads to a smaller number of rules being processed compared to creating separate backups 201, 202, based on the first set of rules 102 and the second set of rules 104.

Optionally the merged backup policy 106 further can define to create the backup 108 based on a pre-defined rule 203 in the merged set of rules 107. This avoids to create the backup 108 also based on unnecessary rules, when e.g., an SLA already can be fulfilled when the backup 108 is created based on the pre-defined rule 203.

Optionally, the merged backup policy 106 further may define to create the backup 108 based on each rule in the merged set of rules 107. This ensures that the backup 108 is created based on all required rules, when e.g., an SLA only can be fulfilled when the backup 108 is created based on all rules in the merged set of rules 107.

Optionally, the merged backup policy 106 further defines to create the backup 108 based on a largest element 204 and/or based on a smallest element 205 in the merged set of rules 107. This ensures that the backup 108 is created based on the required largest element 204 or smallest element 205, when e.g., an SLA already can be fulfilled when the backup 108 is created only based on the largest element 204 and/or only based on the smallest element 205 in the merged set of rules 107. Thereby, creating the backup 108 based on other unnecessary elements can be avoided.

As it is further illustrated in FIG. 2, the first set of rules 102 can comprise a first backup frequency rule 206, the second set of rules 104 can comprise a second backup frequency rule 207, and the merged set of rules 107 can comprise the first backup frequency rule 206 and the second backup frequency rule 207. The merged backup policy 106 further can define that the backup 108 is created according to each backup frequency rule 206, 207 in the merged set of rules 107. Thereby, the backup 108 is created at all points of time, which are defined in the first backup policy 101 and the second backup policy 103.

In particular, a backup frequency rule 206, 207 defines how frequently the backup 108 is created (e.g., hourly, daily, weekly, monthly). In particular, a frequency rule 206, 207 defines both backup frequency and/or backup retention.

More specifically, the backup frequency can be specified by an interval between backups 108 (every X time units). A backup frequency rule 206, 207 can comprise at least one of the following intervals: Hourly: Every X hours; Daily: Every X days; Weekly: Every X weeks, at <weekday (Sun/Mon/ . . . )>; Monthly: Every X months, at <1/2/3/4 <weekday> of the month>; Quarterly: Every X quarters; First quarter of the year starts on <month>, at <1st/last> <week day> of the quarter; Yearly: Every X years; First month of the year is on <month>, at <1st/last> <week day> of the year.

Merging of backup frequency rules 206, 207 can in particular be carried out as described in the following example:

For example, when the first backup policy 101 is an hourly policy and defines (in the first set of rules 102) to make a backup every two hours, and the second backup policy 103 is an hourly policy and defines (in the second set of rules 104) to make a backup every 4 hours, the merged set of rules 107 in the merged backup policy 106 will define to create the backup 108 every two hours. In general, the amount of hourly backups 108 (according to the merged set of rules 107) will be the maximum of all the rules (i.e., the first set of rules 102 and the second set of rules 104). When there are specific rules to have a backup 108 at specific hours, all the backups according to these specific hours will be included.

According to another example concerning daily backups, where the first set of rules 102 defines to create a backup every 2 days, and the second set of rules 104 defines to create a backup every Sunday, the merged backup policy 106 and the merged set of rules 107 are going to define to create the backup 108 every 2 days, but when a backup 108 is created on Saturday, a backup 108 is also going to be created on Sunday. The device 100 is going to create a minimum schedule of backups such that all the backup frequency rules 206, 207 are followed.

As it is further illustrated in FIG. 2, the first set of rules 102 may comprises a first backup activity rule 208 and the second set of rules 104 may comprises a second backup activity rule 209.

The merged set of rules 107 can comprise the first backup activity rule 208 and the second backup activity rule 209, and the merged backup policy 106 further may define that the backup 108 is created according to at least one backup activity rule 208, 209 in the merged set of rules 107.

A backup activity rule 208, 209 optionally can limit a backup activity to a daily backup window, that is, a specific time range <hh:mm-hh:mm> within a day, when the copy activity can take place. By default, no backup window is defined, that is, the backup 108 can be created at any time.

A backup activity rule 208, 209 optionally can start the backup 108 at a certain date and time. When it is out of another relevant backup window time interval, the backup 108 is commenced within a next backup window. By default, a first full backup will start according to the frequency rules.

Backup activity rules 208, 209 can be merged according to the following example: When merging the backup activity rules 208, 209, it is defined in the merged backup policy 106 that at least one of the backup activity rules 208, 209 is followed. That is, an "or" relationship for the backup activity rules 208, 209 can be assumed, as backup activity rules 208, 209 define when backup activity is allowed. When there are multiple backup activity rules 208, 209 applied, the backup activity is allowed when one of the rules allows it.

For example, when one backup activity rule 208 defines to start between 8 am and 10 am and another backup activity rule 209 defines to start between 9 am and 12 am, the backup 108 can be started between 8 am and 12 am.

As it is further illustrated in FIG. 2, the first set of rules 102 can comprise a first retention period 210 and the second set of rules 104 can comprise a second retention period 211. The merged set of rules 107 may comprise the first retention period 210 and the second retention period 211, wherein the merged backup policy 106 further may define that the backup 108 is kept in a predefined storage 212 for the longer one of the first retention period 210 and the second retention period 211.

A retention period 210, 211 which also defines the storage 212 for storing the backup 108 may also be called archive rule. The predefined storage 212 can be e.g., a local storage or an archive.

Archiving can be used to offload the backup 108 to a cheaper tier, where it is usually kept for a long period. As the backup 108 gets "colder" (i.e., less relevant, less accessed) over time, at some point, the backup 108 can be moved from a local storage (which is more expensive and small) to an archive (which is cheaper and larger). There are also more fine grained situations, which can be governed using proper archiving rules.

A retention period 210, 211 may define a period of time the backup 108 remains only at a local storage, before it gets archived. The retention period 210, 211 can be specified e.g., in days, weeks, months, quarters, or years. The retention period 210, 211 can be capped by a maximum retention e.g., defined in a backup frequency rule 206, 207. The backup 108 cannot stay at a local storage longer than this maximum possible retention period.

However, the backup 108 may be archived while it is also retained locally. An archive may be e.g., a tape storage, a network file system (NFS), a cloud, etc. In particular, a local storage can be directly attached to the device 100. In particular, an archive can be a separate and cheaper storage tier, e.g., outside the backup device, that is used to retain the backup 108 for a long time, or to retain a backup 108 that is very rarely accessed.

According to a specific example, a merged backup policy 106 with a merged set of rules 107 comprising the first and second retention period 210, 211, (which can also be called archive rule) may include at least one of the following three specifications:

1. How long is the backup kept at a local storage (e.g., a local secondary storage): This value will be the maximum value of the first retention period 210 and the second retention period 211. So, when the first retention period 210 defines to keep the backup 108 locally for 1 day and the second retention period 211 defines to keep it for 3 days, the merged backup policy 106 with the merged set of rules 107 will define to keep the backup 108 locally for 3 days.

2. When is the backup 108 moved to an archive: This value will be the minimum value of the first retention period 210 and the second retention period 211. When the first retention period 210 defines to archive the backup 108 immediately, it is going to be archived immediately, no matter what the second retention period 211 defines.

3. How long is the backup 108 going to be kept in the archive: This value will be the maximum value of the first retention period 210 and the second retention period 211. For example when the first retention period 210 defines to keep the backup 108 in an archive for 1 month and the second retention period 211 defines to keep the data for 3 month, the merged backup policy 106 with the merged set of rules 107 will define to keep the data for 3 months. In case that one of the first or second retention 210, 211 includes a compliance rule, which defines that the backup does not need to be kept longer than this period, the merged backup policy 106 will define, to not keep the backup 108 longer than this period of the compliance rule.

In particular, retention refers to the act of keeping a backup 108, usually for a policy-based period of time. When the backup 108 reached its effective retention period, the backup 108 can be removed. This is also called expiration.

As it is further illustrated in FIG. 2, the first set of rules 102 can comprise a first backup replication rule 213 and the second set of rules 104 can comprise a second backup replication rule 214. The merged set of rules 107 may comprises the first backup replication rule 213 and the second backup replication rule 214. The merged backup policy 106 further may define that the backup 108 is replicated according to each backup replication rule in the merged set of rules 107.

A replica is a copy of the backup 108 that is replicated from a local storage to a (usually) remote system for disaster recovery purposes. Typically, a replica is a copy of the backup 108 is stored in a place near where it may be needed for disaster recovery.

For example, a replica is needed for fast and current recovery from a disaster, typically in a disaster recovery site. Therefore, when replication is in use, copies of the backup 108 get replicated as soon as the backup 108 is created.

A replication rule 213, 214 may specify a replica retention period. This may include to keep the most recent replica only (this may be a default setting). This may alternatively include to keep a replica of the backup 108 according to a specified replica retention period. This period is specified e.g., in days, weeks, months, quarters, or years.

To merge the first and the second replication rule 213, 214, the merged backup policy 106 can define that the first and the second replication rule 213, 214 are both part of the merged set of rules 107, and the all replication rules 213, 214 in the merged set of rules are going to be applied to the backup creation. That is, the backup replication rules will be merged in a similar way as the backup frequency rules 206, 207. For example, the replication may start at the earliest point of time defined in the first or second replication rule 213, 214.

As it is further illustrated in FIG. 2, the first set of rules 102 may comprise a first backup data format rule 215, the second set of rules 104 may comprise a second backup data format rule 216, and the merged backup policy 106 may define a period of time 217 for which the backup 108 is kept in a predefined data format based on the first backup data format rule 215, the second backup data format rule 216, an amount of storage that is occupied by the backup 108 if it is created according to the first backup data format rule 215 and an amount of storage that is occupied by a the backup 108 if it is created according to the second backup data format rule 216.

In other words, when the merged backup policy 106 is created, space occupied by the backup 108 if it would be created according to the first backup data format rule 215 and space occupied by the backup 108 if it would be created according to the second backup data format rule 216 are evaluated to define a desired data format in which the backup 108 is kept for a predefined amount of time 217.

According to a backup data format rule 215, 216, the backup 108 may be kept in multiple formats:

For example, this may include a native format, which is less space efficient but allows fast disaster recovery, or test and developments abilities.

This may also include a de-duplicated format, which has efficient space consumption, but no abilities to do immediate disaster recovery or test and development.

When a backup 108 is archived, it is kept in a de-duplicated format. When data is replicated, it is kept in native format. However, also a locally stored backup may be kept in either a de-duplicated format or a native format.

There also may be a data format rule, which defines that the backup 108 is kept in native format for some period of time and afterwards is transferred to a de-duplicated format (either locally, or sent to external archive).

When the merged backup policy 106 is created to define the period of time 217 for which the backup 108 is kept in a predefined data format (based on the first backup data format rule 215, the second backup data format rule 216), it is taken into account that the first backup data format rule 215 may specify to keep the backup 108 in de-duplicated format and for a long period of time (e.g., a month), while the second backup data format rule 216 may define to keep the backup 108 in native format but only for a short period of time (e.g., a week). Keeping the backup 108 in native format however is much more expensive.

According to one example, the merged backup policy 106 may define to keep the backup 108 in native format for the maximum period of time which is defined for keeping it in native format in the first or second backup data format rule 215, 216. Afterwards, the backup 108 can be kept in de-duplicated format.

As also a de-duplicated backup 108 may consume a considerable amount of space, there are options to keep the backup 108 in a mixed format:

1. The device 100 may evaluate the amount of space needed to keep the backup 108 in native format for the maximum period of time defined in a backup data format rule 215, 216, (e.g., for the backup frequency interval) and compare it to the saving of data if the backup 108 was kept in a de-duplicated format after a pre-defined period of time during which a native format is required. When the de-duplicated format will not save space, the device 100 will keep the backup 108 in native format.

2. The device 100 may also create a differential de-duplicated format. When the backup 108 gets older, the differences from the oldest native format image is kept in the de-duplicated format. This way the de-duplicated format may save space significantly.

In a specific embodiment, the first option above allows management of the backup 108 using other backup devices, while the second one uses a specific backup device, which is part of policy management.

In a specific embodiment, an example algorithm for merging backup policies 101, 103 may be implemented as described in the following:

The algorithm obtains Policy1 (i.e., the first backup policy 101) and Policy2 (i.e., the second backup policy 103). Policy1 and Policy2 are going to be merged into Policy3.

Policy1 includes backup-frequency-rule-1, backup-data-format-rule-1, backup-activity-rule-1, backup-retention-period-1, and backup-replication-rule-1.

Policy2 includes backup-frequency-rule-2, backup-data-format-rule-2, backup-activity-rule-2, backup-retention-period-2, and backup-replication-rule-2.

The merge algorithm will create a new policy Policy3 (i.e., the merged backup policy 106).

Policy3 includes backup-frequency-rule-3, backup-data-format-rule-3, backup-activity-rule-3, backup-retention-period-3, and backup-replication-rule-3.

According to the processing of the device 100, which creates the merged backup policy:

the backup 108 created based on backup-frequency-rule-3 is a superset of backups created by backup-frequency-rule-1 and backups created by backup-frequency-rule-2;

the backup 108 created based on backup-data-format-rule-3 is stored in native format longer or equal than based on backup-data-format-rule-1 and based on backup-data-format-rule-2;

according to backup-activity-rule-3 the backup 108 can be created either when it is allowed by backup-activity-rule-1 or backup-activity-rule-2;

backup-retention-period-3 makes sure that the backup 108 is archived when either it needs to be archived based on backup-retention-period-1 or backup-retention-period-2;

backup-replication-rule-3 will make sure that a replica is available when it should be available either according to backup-replication-rule-1 or backup-replication-rule-2.

Once all the policy parameters are defined, a new policy (i.e., the merged backup policy 106) is defined and is assigned to the backup object 105.

The device 100 may remove the assignment of the first backup policy 101 and the second backup policy 103 from the backup object 105, when the first backup policy 101 and the second backup policy 103 are assigned to the backup object 105. Instead, the merged backup policy 106 is assigned to the backup object 105. The device 100 in turn no longer creates the backup based on the first backup policy 101 and the second backup policy 103, but only based on the merged backup policy 106.

The device 100 may further create the backup 108 of the backup object 105 based on the merged backup policy 106. That is, the device 100 not only creates the merged backup policy 106 including the merged set of rules 107, but also performs the technical steps to create that backup 108 based on the merged backup policy 106. In particular, data is copied to a storage based on the merged backup policy 106.

In a specific embodiment, a protection object may have unique meta-data attributes (i.e., a fingerprint), that can deterministically identify the protection object, through changes in may have in its native environment. The collection of such attributes is the protection object fingerprint.

Figure 3:
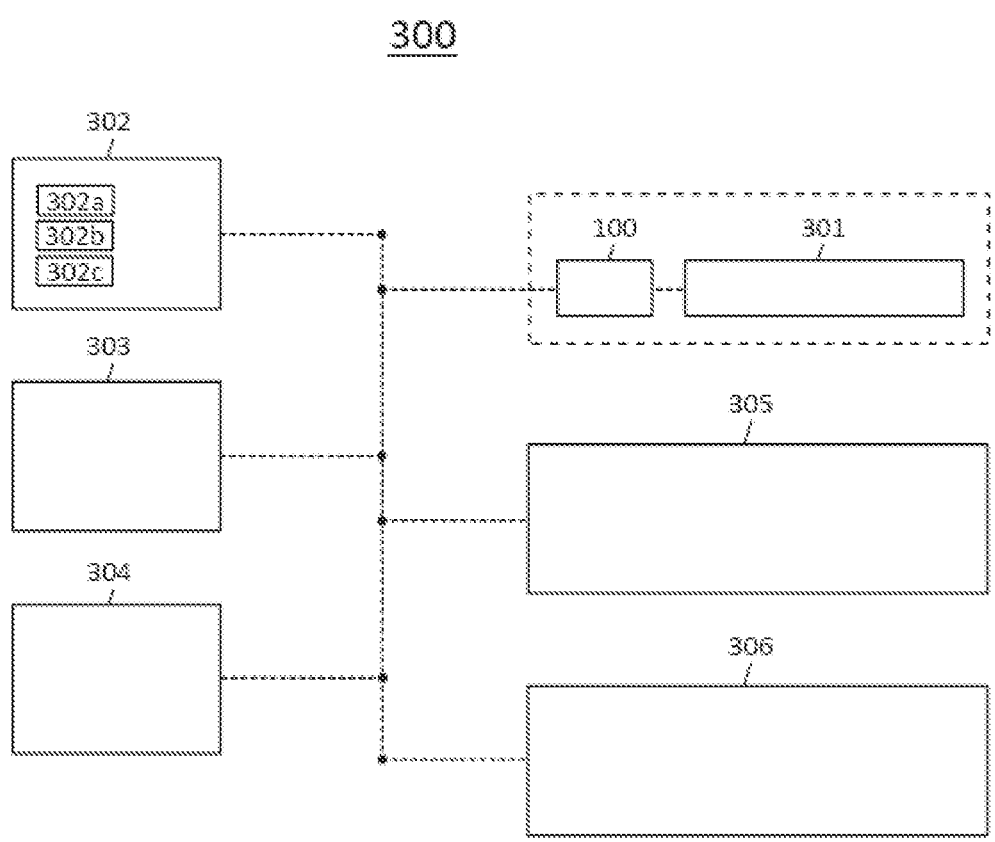
FIG. 3 is a diagram illustrating a schematic view of a system according to an embodiment of the present disclosure.

FIG. 3 shows a system 300 according to an embodiment of the present disclosure. The system 300 is a backup system and comprises the device 100. The system 300 further comprises a local storage 301. Although the device 100 and the local storage 301 are illustrated as separate entities in FIG. 3, the device 100 may also comprise the local storage 301, or the device 100 and the local storage 301 may be configured as one single entity (as indicated by the rectangle in dashed lines in FIG. 3).

The system 300 further comprises several hosts 302, 303 and 304 (e.g., host computers, that is, a physical machine). Thereby, host 302 runs three virtual machines 302a, 302b and 302c. However, there may be an arbitrary distribution of hosts and virtual machine in the backup system 300. The system 300 further comprises an archive 305 (that is, a storage for colder backups, which is less expensive). The system 300 also comprises a replica site 306, that is a storage associated with a host or a virtual machine to which a backup is to be restored from the replica site 306. All this entities are connected e.g., by means of a network connection.

The hosts 302, 303, 304 and the virtual machines 302a, 302b, 302c are backup objects 105. The device 100 in FIG. 3 is configured to create a backup 108 of a backup object 105 based on the merged backup policy 106, as it was described in one of the figures above. For ease of illustration, the backup 108 and the merged backup policy 106 are not shown in FIG. 3.

Typically, the backup 108 created by the backup device 100 is stored in the local storage 301. According to the merged backup policy 106 it can be defined that the backup 108 is kept in a predefined storage 212 (e.g., in the local storage 301 or in the archive 305). There, the backup 108 may be kept for a longer one of a first retention period 210 and a second retention period 211, e.g., as described above.

The backup 108 which is created by the device 100 according to the merged backup policy 106 may also be stored in a replica site 306. The replica site 306 is associated with a backup object 105 to which the backup 108 possibly is to be restored. According to FIG. 3, a backup 108 of the host 304 which is first stored in the local storage 301 may also be replicated to the replica site 306. From the replica site 306, it can easily be restored to the host 304. Thereby, a backup 108 can be restored to a host 304 in the replicate site, rather than to a production host. Restoring can be controlled by the merged backup policy 106, which may define that the backup 108 is replicated according to backup replication rules 213, 214 in the merged set of rules 107.

The merged backup policy 106 further may define a period of time 217 for which the backup 108 is kept in a predefined data format, e.g., in the local storage 301, the archive 305 and/or the replica site 306.

The backup 108 can be restored to a corresponding one of the backup objects 105 (controlled by the device 100) from the local storage 301, from the archive 305 or from the replica site 306. The device 100 may only control the process of restoring, that is, the backup 108 is restored directly to the backup object 105, without indirection through the device 100. However, the device 100 may also receive and forward the to be restored data.

Figure 4:
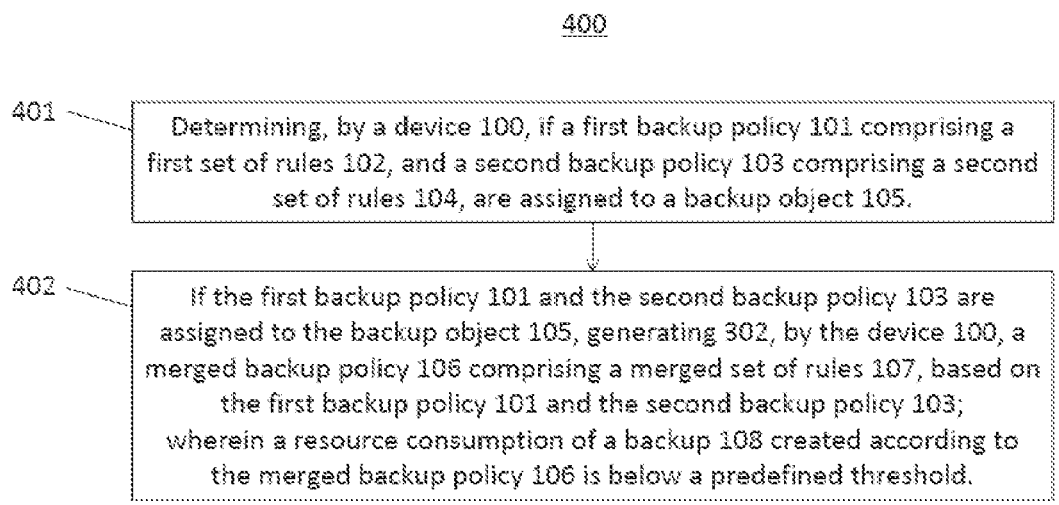
FIG. 4 is a diagram illustrating another schematic view of a method according to an embodiment of the present disclosure.

FIG. 4 shows a schematic view of a method 400 according to an embodiment of the present disclosure. The method 400 is for merging backup policies 101, 103, and comprises a step of determining 401, by a device 100, if a first backup policy 101 comprising a first set of rules 102, and a second backup policy 103 comprising a second set of rules 104, are assigned to a backup object 105. The method further comprises a step of, when the first backup policy 101 and the second backup policy 103 are assigned to the backup object 105, generating 402, by the device 100 a merged backup policy 106 comprising a merged set of rules 107, based on the first backup policy 101 and the second backup policy 103; wherein a resource consumption of a backup 108 created according to the merged backup policy (106) is below a predefined threshold.

The present disclosure has been described in conjunction with various embodiments as examples as well as implementations. However, other variations can be understood and effected by those persons skilled in the art and practicing the claimed disclosure, from the studies of the drawings, this disclosure, and the independent claims. In the claims as well as in the description, the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device comprising:
a memory configured to store instructions; and
a processor coupled to the memory and configured to execute the instructions to cause the device to:
determine that a first backup policy and a second backup policy are assigned to a backup object, wherein the first backup policy comprises a first set of rules comprising a first backup frequency rule, and wherein the second backup policy comprises a second set of rules comprising a second backup frequency rule;
generate a merged backup policy comprising a merged set of rules based on the first backup policy and the second backup policy, wherein the merged backup policy is configured to create a first backup using a first resource consumption that is below a predefined threshold; and
create, based on the merged backup policy, the first backup of the backup object at a first frequency and at a second frequency, wherein the first frequency is based on the first backup frequency rule, and wherein the second frequency is based on the second backup frequency rule.

2. The device of claim 1, wherein the predefined threshold is less than a sum of a second resource consumption of a second backup created according to the first backup policy and a third resource consumption of a third backup created according to the second backup policy.

3. The device of claim 1, wherein the merged set of rules is a union set of the first set of rules and the second set of rules.

4. The device of claim 1, wherein the merged backup policy further defines creating the first backup based on a pre-defined rule in the merged set of rules.

5. The device of claim 1, wherein the merged backup policy defines creating the first backup based on each rule in the merged set of rules.

6. The device of claim 1, wherein the merged backup policy defines creating the first backup based on a largest element or a smallest element in the merged set of rules.

7. The device of claim 1, wherein the first set of rules comprises a first backup data format rule, wherein the second set of rules comprises a second backup data format rule, wherein the merged set of rules comprises the first backup data format rule and the second backup data format rule, and wherein the merged backup policy defines creating the first backup in both a first backup data format according to the first backup data format rule and a second backup data format according to the second backup data format rule.

8. The device of claim 1, wherein the first set of rules comprises a first backup activity rule, wherein the second set of rules comprises a second backup activity rule, wherein the merged set of rules comprises the first backup activity rule and the second backup activity rule, and wherein the merged backup policy defines creating the first backup according to the first backup activity rule and the second backup activity rule.

9. The device of claim 1, wherein the first set of rules comprises a first retention period, wherein the second set of rules comprises a second retention period, wherein the merged set of rules comprises the first retention period and the second retention period, and wherein the merged backup policy defines that the first backup is kept in a predefined storage for the longer of the first retention period or the second retention period.

10. The device of claim 1, wherein the first set of rules comprises a first backup replication rule, wherein the second set of rules comprises a second backup replication rule, wherein the merged set of rules comprises the first backup replication rule and the second backup replication rule, and wherein the merged backup policy defines replicating the first backup according to the first backup replication rule and the second backup replication rule.

11. The device of claim 1, wherein the processor is further configured to:
remove an assignment of the first backup policy and the second backup policy from the backup object; and
assign the merged backup policy to the backup object.

12. A method comprising:
determining that a first backup policy and a second backup policy are assigned to a backup object, wherein the first backup policy comprises a first set of rules comprising a first backup frequency rule, and wherein the second backup policy comprises a second set of rules comprising a second backup frequency rule;
generating a merged backup policy comprising a merged set of rules based on the first backup policy and the second backup policy, wherein the merged backup policy is configured to create a first backup using a first resource consumption that is below a predefined threshold; and
creating, based on the merged backup policy, the first backup of the backup object at a first frequency and at a second frequency, wherein the first frequency is based on the first backup frequency rule, and wherein the second frequency is based on the second backup frequency rule.

13. The method of claim 12, wherein the predefined threshold is less than a sum of a second resource consumption of a second backup created according to the first backup policy and a third resource consumption of a third backup created according to the second backup policy.

14. The method of claim 12, wherein the merged set of rules is a union set of the first set of rules and the second set of rules.

15. The method of claim 12, wherein the merged backup policy further defines creating the first backup based on a pre-defined rule in the merged set of rules.

16. The method of claim 12, wherein the merged backup policy further defines creating the first backup based on each rule in the merged set of rules.

17. The method of claim 12, wherein the merged backup policy further defines creating the first backup based on a largest element or a smallest element in the merged set of rules.

18. The method of claim 12, further comprising:
removing an assignment of the first backup policy and the second backup policy from the backup object; and
assigning the merged backup policy to the backup object.

19. The method of claim 12, wherein the first set of rules comprises a first backup data format rule, wherein the second set of rules comprises a second backup data format rule, wherein the merged set of rules comprises the first backup data format rule and the second backup data format rule, and wherein the merged backup policy defines creating the first backup in both a first backup data format according to the first backup data format rule and a second backup data format according to the second backup data format rule.

20. A computer program product comprising computer-executable instructions stored on a non-transitory computer-readable storage medium, the computer-executable instructions when executed by a processor of a device, cause the device to:
  determine that a first backup policy and a second backup policy are assigned to a backup object, wherein the first backup policy comprises a first set of rules comprising a first backup frequency rule, and the second backup policy comprises a second set of rules comprising a second backup frequency rule; and
  generate a merged backup policy comprising a merged set of rules based on the first backup policy and the second backup policy, wherein the merged backup policy is configured to create a first backup using a first resource consumption that is below a predefined threshold; and
  create, based on the merged backup policy, the first backup of the backup object at a first frequency and at a second frequency, wherein the first frequency is based on the first backup frequency rule, and wherein the second frequency is based on the second backup frequency rule.

\* \* \* \* \*